United States Patent

[11] 3,567,122

| [72] | Inventors | George L. Congdon |
| --- | --- | --- |
| | | Fort Atkinson; |
| | | Fred W. Kufrin, Janesville, Wis. |
| [21] | Appl. No. | 842,123 |
| [22] | Filed | July 16, 1969 |
| [45] | Patented | Mar. 2, 1971 |
| [73] | Assignee | Western Industries, Inc. |
| | | Milwaukee, Wis. |

[54] WATER SPRINKLER HAVING COUNTER MEANS FOR AN OSCILLATING DISTRIBUTING TUBE OF UNIFORM SPEED
10 Claims, 9 Drawing Figs.

[52] U.S. Cl.................................................. 239/69,
137/624.11, 239/242
[51] Int. Cl.................................................... A01g 27/00
[50] Field of Search.......................................... 239/69, 67,
242, 68; 137/624.17, 624.22, 624.11; 222/20

[56] References Cited
UNITED STATES PATENTS

| 1,550,094 | 8/1925 | Roberts.................... | 239/67X |
| --- | --- | --- | --- |
| 1,857,627 | 5/1932 | Elder....................... | 222/20 |
| 2,534,979 | 12/1950 | Le Clair................... | 222/20 |
| 2,698,111 | 12/1954 | Wiley....................... | 222/20 |
| 3,097,762 | 7/1963 | Charnota et al........... | 222/20 |

Primary Examiner—M. Henson Wood, Jr.
Assistant Examiner—Thomas C. Culp, Jr.
Attorney—James E. Nilles ABSTRACT: A water sprinkler having an oscillating water tube that moves with a uniform velocity through an arc of adjustable length, including means for counting the number of oscillations of the distributing tube and depositing a predetermined amount of water per unit area of ground regardless of water pressure or the length of oscillatory swinging movement of the water tube. The means for oscillating the tube insures that it moves with uniform speed and insures that a known density of water deposit can be programmed regardless of the pressure of the water or area of ground to be covered.

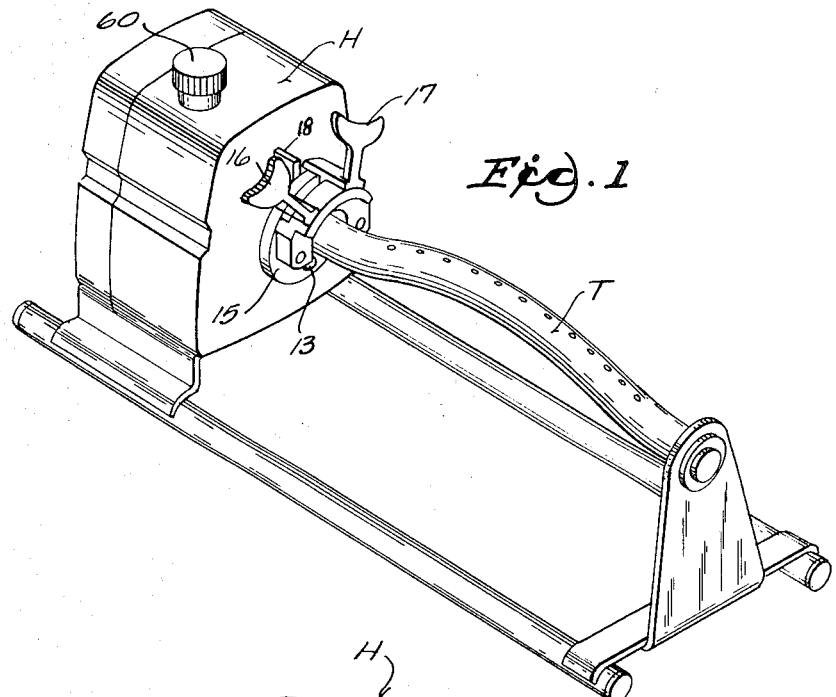
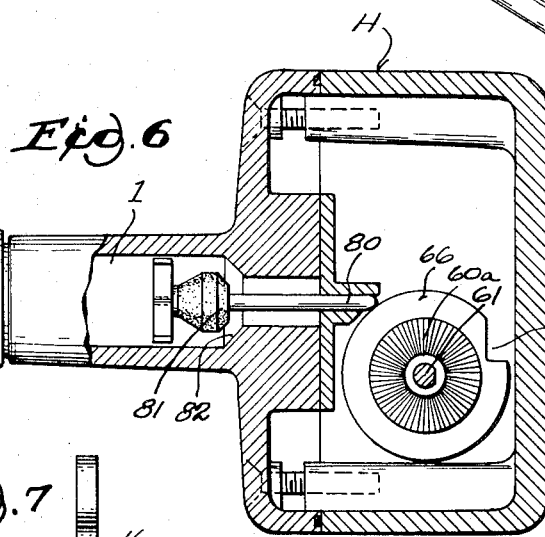
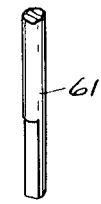
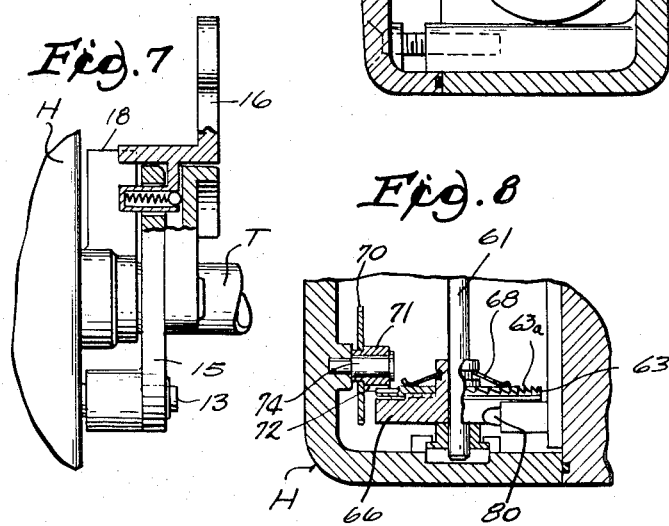
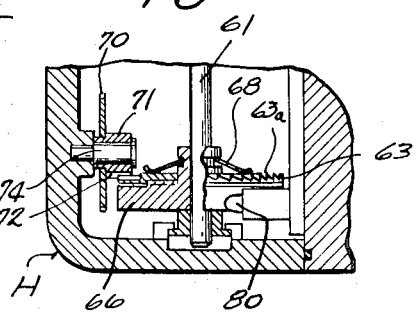
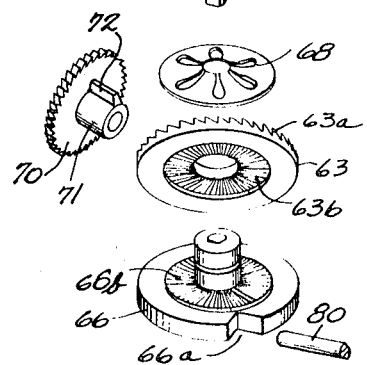

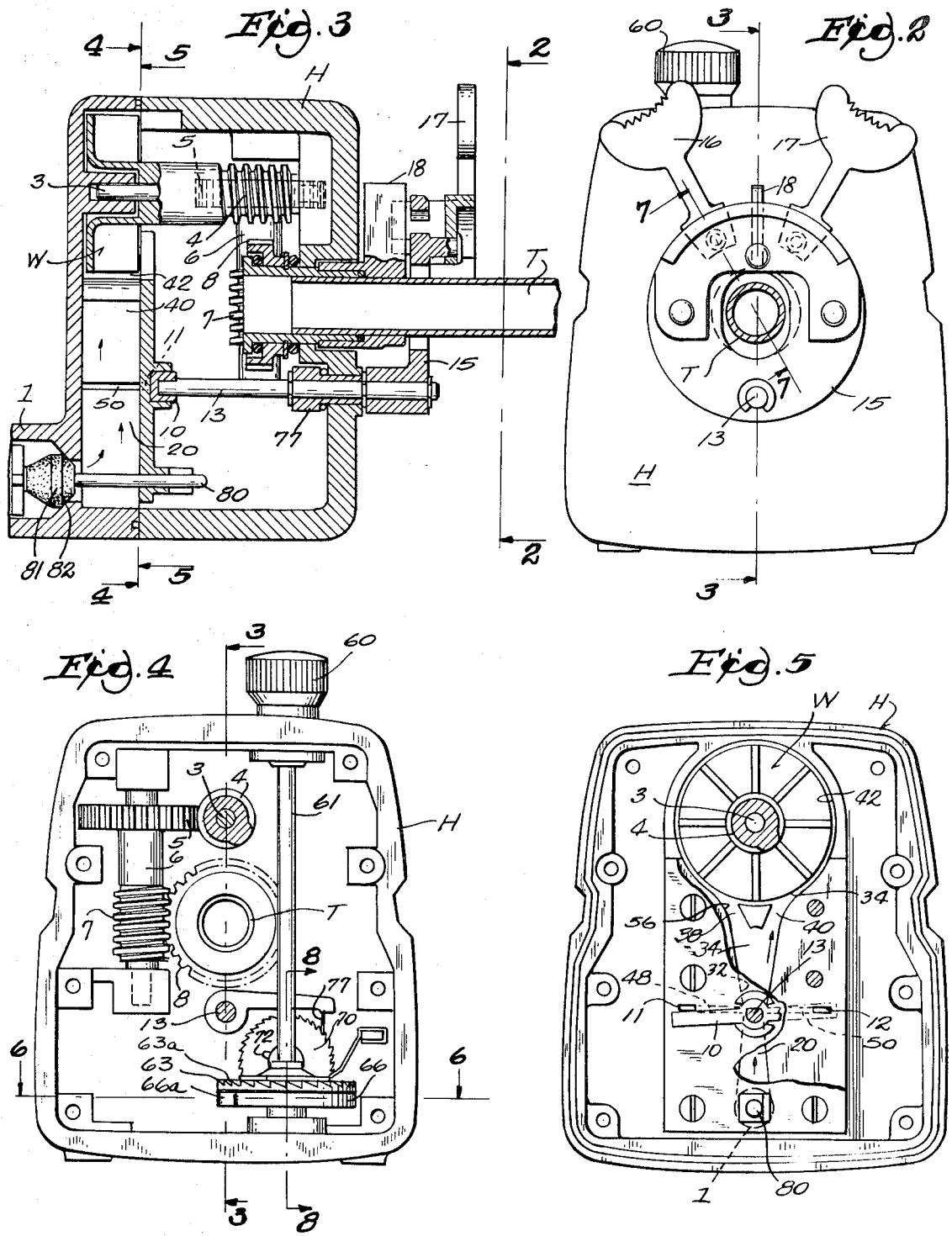

3,567,122

WATER SPRINKLER HAVING COUNTER MEANS FOR AN OSCILLATING DISTRIBUTING TUBE OF UNIFORM SPEED

BACKGROUND OF THE INVENTION

Water sprinkler devices of the oscillating nozzle or water tube type have heretofore been known and they act to cause the water-distributing tube to oscillate and thereby distribute water over a given area. It is also conventional to provide adjustable stops so as to define the limits through which the water tube oscillates and thereby adjust or define the area of the ground to be covered.

These prior art devices have not proved to be satisfactory for a number of reasons. For example, the water distributed by some of them may vary with the pressure of the water. Other shut off when a given volume of water passes through a meter. In many other of these prior art devices, a crank arm acts to impart the oscillating movement to the water-distributing tube, and the rate of coverage of the ground is inversely proportional to the area of the ground which is covered; usually these crank arms were adjustable in length so as to vary the speed or travel of the oscillating water tube and thereby the rate of depositing water on the ground over a given area varied considerably.

An example of the prior art liquid-metering sprinklers is shown in the U.S. Pat. No. 3,187,943 issued Jun. 8, 1965 to A. F. Wolf, wherein the length of time the unit acted to deposit water was determined by a rate dependent on the turbine wheel speed and therefore the water pressure and volume of water metered per time unit.

SUMMARY OF THE INVENTION

The present invention provides a lawn sprinkler having an oscillating water-distributing nozzle or tube which is driven at a uniform angular velocity through an arc which is determined by settable stops. The sprinkler water tube has an oscillating movement of constant velocity and the amount of water distributed on any area is uniform; the rate of coverage, that is the amount of water per oscillation remains constant even though the dimensions of the ground area to be covered are changed by moving the settable stops.

The arrangement is such that the amount of water deposited is determined by counting the number of oscillations of the uniformly moving water tube. The water tube of constant velocity can be programmed to deliver a predetermined density of water uniformly on the ground, and is unaffected by variations in water pressure or the area of ground to be covered.

These and other objects and advantages of the present invention will appear hereinafter as this disclosure progresses, reference being had to the accompanying drawings.

BRIEF DESCRIPTION OF THE DRAWINGS

FIG. 1 is a perspective view of a lawn water sprinkler embodying the present invention;

FIG. 2 is an elevational, sectional, view of a portion of the sprinkler shown in FIG. 1, but on an enlarged scale, the view also being taken along line 2—2 in FIG. 3;

FIG. 3 is a sectional view taken along line 3—3 in either FIGS. 2 or 4;

FIG. 4 is a sectional view taken along line 4—4 in FIG. 3;

FIG. 5 is a sectional view taken along line 5—5 in FIG. 3;

FIG. 6 is a sectional view taken along line 6—6 in FIG. 4;

FIG. 7 is a fragmentary, partially sectional view taken along line 7—7 in FIG. 2;

FIG. 8 is a sectional view taken along line 8—8 in FIG 4; and

FIG. 9 is a persepective, exploded view of certain of the parts shown in the other views.

DESCRIPTION OF THE PREFERRED EMBODIMENT

The sprinkler shown for the purpose of illustrating the present invention includes a housing H having a fluid inlet 1 which has a conventional coupling 2 for attachment to a water hose (not shown). A fluid-distributing tube T is mounted for oscillation, generally about its longitudinal axis, in the housing H. A fluid driven, vaned wheel W is mounted on shaft 3 in the housing for rotation in either direction due to fluid introduced to it from the inlet, as indicated by the flow arrows shown in FIGS. 3 and 5. This wheel W is connected to the tube T through worm 4 (FIGS. 3 and 4), which is in constant mesh with gear 5. Gear 5 is fixed on shaft 6 along with worm 7, and a gear 8 is in turn fixed to the inner end of tube T.

The tube is thereby moved in an arcuate path, in one direction or another, depending on the direction in which the vaned, fluid-driven wheel W is rotated by the water. The means for oscillating the tube is shown and described in our copending U.S. application Ser. No. 842,124 filed Jul. 16, 1969, entitled "Fluid Sprinkler Having Means for Driving and Reversing an Oscillating Distributing Tube of Uniform Speed" and only a brief reference to it will now be made.

The direction in which the wheel W and consequently the tube T are rotated, is determined by the position of a switch bar 10 (FIGS. 3 and 5). This bar is adapted to alternately cover and uncover ports 11 and 12, so that one port is blocked while the other is open, and vice versa. The bar 10 is oscillatably mounted by a quadrant shaft 13, to which in turn is fixed a quadrant 15. A pair of spaced stops 16 and 17 are adjustably fixed on the quadrant, whereby tube arm 18, in its oscillatory movement, strikes one stop or the other, the bar 10 is shifted through a small arcuate movement to alternately cover one port and open the other port.

With the above-mentioned directional flow valve means including bar 10 and ports 11 and 12, the wheel W is caused to be reversed in its movement. More specifically, water entering the inlet and flowing through the convergent portion 20 of the nozzle will tend to form a laminar stream. The laminar stream thus formed will tend to cling either to the outer wall of the discharge port 38 or the outer wall of the discharge port 40, thus creating a bistable element whereby the stream will continue to flow along a particular wall unless directed to the opposite wall by an outside force. Thus the water stream flowing through the port or passage 38 is directed against the vane of the turbine wheel W to drive the wheel in either a clockwise or counterclockwise direction depending on which direction the stream of water in the nozzle chooses to take and consequently through which of the ports 38, 40 it enters the annular chamber 42. Extending laterally in opposite directions from the narrow portion 32 of the nozzle formed by the conduit 20, 32, 34 are a pair of passages 48, 50 which terminate in the said ports 11 and 12, respectively. Water at service pressure introduced at one of these ports will cause the flow of water through the conduit 20 to be directed against the opposite wall as it leaves the low pressure area 32 and proceeds along the divergent portion 34 of the nozzle. For example, pressure introduced at port 11 in FIG. 5 will direct the flow of water through the divergent portion 34 of the nozzle against the wall 56 and thus through the discharge port 38 as indicated by the arrow, thereby causing the turbine wheel W to rotate in a clockwise direction.

COUNTING AND SHUT-OFF MEANS

Means are provided for counting the number of oscillations of the tube T and causing the water to be shut off after the preset number of oscillations has occurred. The tube is driven at a uniform angular velocity through the arc determined by the settable stops 16 and 17. Thus, the amount of water distributed on an area is uniform per oscillation of the tube, and the amount of water deposited is determined by the number of oscillations as set by a control knob 60, as will now be explained in detail.

As shown in FIGS. 4, 6, 8 and 9, a vertical shaft 61 is rotatably mounted in the housing and knob 60 is fixed at its upper end. A toothed counter disc 63 (FIGS. 4, 8 and 9) is mounted to shaft 61, and can move relative thereto under certain conditions, as will appear. The teeth 63a are located on the upper side of disc 63, while its lower side has serrations 63b thereon (FIG. 9). The counting means includes a movable member in the form of a cam wheel 66 fixed on the adjustment shaft 61, and this wheel has serrations 66b on its upper surface which disengageably mesh with the serrations on the disc 63. A spring 68 fixed on shaft 61 resiliently holds the disc 63 against cam wheel 66. Thus, the knob 60 can set the cam wheel 66 relative to the disc 63 without moving the latter which is connected with a ratchet wheel 70, now to be described.

The ratchet wheel 70 has a hub 71 which in turn has a single tooth 72 (FIG. 9) that is engageable with the teeth 63a of disc 63. The ratchet wheel 70 is rotatably mounted on a stub shaft 74 (FIG. 8) in the housing H. The ratchet wheel teeth (FIG. 4) are engaged by the pawl 77 which is fixed on shaft 13.

Thus, as the tube T is oscillated, the quadrant 15 oscillates shaft 13, which in turn drives the ratchet wheel, one tooth at a time, through pawl 77. The ratchet wheel in turn drives the disc 63 through its single tooth 72, and disc 63 rotates the cam wheel 66 along with it.

The cam wheel 66 has a notch 66a formed in its periphery, and this notch receives a stopper pin 80 (FIGS. 4, 6, and 8) when the notch is in alignment therewith. The pin 80 carries a shutoff valve means in the form of a stopper 81 that can abut against a valve seat 82 to shut off water flow.

Thus, the notch 66a constitutes a fluid shutoff portion and the remainder of the periphery of the cam wheel constitutes a fluid flow position.

The knob 60 can be rotated to rotatably set the cam wheel 66 at any position, for example, one full turn or any portion thereof. After the water is then turned on, the oscillations of the tube T are counted, that is, the tube movement causes return movement of the cam wheel until the cam notch 66a is presented to the stopper pin 80, permitting the latter to shift due to water pressure and engage in the notch, shutting off water flow.

We claim:

1. A fluid sprinkler comprising, a housing having a fluid inlet, shutoff valve means in said fluid inlet and shiftable between fluid shutoff and fluid flow positions, a fluid-distribution tube mounted on said housing for oscillation through an arcuate path, drive means connected to said tube for moving the latter in said oscillating arcuate path, counting means actuated by movement of said tube and including a movable member having a fluid flow portion and a fluid shutoff portion, said shutoff valve means engageable with said movable member portions, and adjustable means for setting said counting means to permit oscillatory movement of said tube through a predetermined number of oscillations after which said movable member has moved to present its said fluid shutoff portion to said valve means to permit the latter to shift and shut off the flow of fluid.

2. A sprinkler as set forth in claim 1 further characterized in that said counting means includes a rotatable shaft which is settable by said adjustable means, and said movable member is a cam wheel fixed on said shaft and having a notch in its periphery which defines said shutoff portion, and said valve means includes a shiftable rod engageable in said notch to shut off fluid flow, and a ratchet drive means connected between said tube and said shaft.

3. A sprinkler as defined in claim 2 further characterized in that said ratchet drive means includes a pawl shifted by movement of said tube, a ratchet wheel engaged by said pawl and rotated thereby, a counter disc mounted on said rotatable shaft and having teeth thereon, said ratchet wheel also having a tooth for engagement with said counter disc teeth whereby the ratchet wheel rotates said shaft through said counter disc.

4. A fluid sprinkler comprising, a housing having a fluid inlet, shutoff valve means in said fluid inlet and shiftable between fluid shutoff and fluid flow positions, a fluid-distributing tube mounted for oscillation, drive means connected to said tube for oscillating the latter, counting means connected with said tube and movable in response to an oscillation of said tube, said counting means engageable with said shutoff valve means to permit said valve means to shift and shut off the flow of fluid after a predetermined number of oscillations of said tube, and adjustable means for setting said counting means to permit oscillatory movement of said tube through a predetermined number of oscillations.

5. The sprinkler as claimed in claim 4 further characterized in that said counting means includes a rotatable shaft which is settable by said adjustable means, and also includes a cam wheel fixed on said shaft and having a notch in its periphery, and said valve means includes a shiftable rod engageable in said notch to shut off fluid flow, and a ratchet drive means connected between said tube and said shaft.

6. The sprinkler set forth in claim 5 further characterized in that said ratchet drive means includes a pawl shifted by movement of said tube, a ratchet wheel engaged by said pawl and rotated thereby, a counter disc mounted on said rotatable shaft and having teeth thereon, said ratchet wheel also having a tooth for engagement with said counter disc teeth whereby the ratchet wheel rotates said shaft through said counter disc.

7. A fluid sprinkler comprising a housing having a fluid inlet, a fluid-distributing tube mounted on said housing for oscillation through an arcuate path, a fluid driven wheel connected to said tube for moving the latter in said arcuate path, said wheel being in fluid-receiving communication with said fluid inlet, directional flow valve means connected with said tube and actuated by movement of said tube for causing reversal of movement of said fluid driven wheel and consequently said tube, counting means connected with and actuated by movement of said tube, said counting means including a movable member having a fluid flow portion and a fluid shutoff portion, shutoff valve means in said fluid inlet and shiftable between fluid shutoff and fluid flow positions, said shutoff valve means having a connection with said movable member, and adjustable means for setting said counting means for oscillatory movement of said tube through a predetermined number of oscillations, after which said movable member has moved to present its said fluid shutoff portion to said connection with said valve means to permit the latter to shift and shut off the flow of fluid.

8. A sprinkler as set forth in claim 7 further characterized in that said counting means includes a rotatable shaft which is settable by said adjustable means, and said movable member is a cam wheel fixed on said shaft and having a notch in its periphery which defines said shutoff portion, and said valve means includes a shiftable rod engageable in said notch to shut off fluid flow, and a ratchet drive means connected between said tube and said shaft.

9. A sprinkler as defined in claim 8 further characterized in that said ratchet drive means includes a pawl shifted by movement of said tube, a ratchet wheel engaged by said pawl and rotated thereby, a counter disc mounted on said rotatable shaft and having teeth thereon, said ratchet wheel also having a tooth for engagement with said counter disc teeth whereby the ratchet wheel rotates said shaft through said counter disc.

10. The sprinkler as described in claim 9 further characterized in that said pawl is mounted on a second shaft for oscillation therewith, and said directional flow valve means includes a shiftable switch bar mounted on said second shaft for causing reversal of said fluid-driven wheel when said second shaft reaches the end of its oscillatory movement in either direction.